(12) United States Patent  (10) Patent No.: US 7,892,142 B2
Giorgini  (45) Date of Patent: Feb. 22, 2011

(54) HYDRAULICALLY SERVOCONTROLLED TRANSMISSION FOR A ROAD VEHICLE PROVIDED WITH AN INTERNAL COMBUSTION ENGINE

(75) Inventor: Stefano Giorgini, Minerbio (IT)

(73) Assignee: Magneti Marelli Powertrain S.p.A., Corbetta (IT)

(*) Notice: Subject to any disclaimer, the term of this patent is extended or adjusted under 35 U.S.C. 154(b) by 498 days.

(21) Appl. No.: 12/008,434

(22) Filed: Jan. 11, 2008

(65) Prior Publication Data

US 2008/0200304 A1  Aug. 21, 2008

(30) Foreign Application Priority Data

Jan. 12, 2007  (EP) .................................. 07425011

(51) Int. Cl.
*B60W 10/04* (2006.01)
*B60W 10/02* (2006.01)
*F16H 61/04* (2006.01)
*B60K 26/00* (2006.01)

(52) U.S. Cl. .......................... 477/115; 477/150; 477/82; 477/192

(58) Field of Classification Search .................. 477/50, 477/77, 79, 82, 88, 156, 162, 190, 192, 195, 477/906, 145, 150, 115; 192/219, 219.1, 192/219.4, 220.2
See application file for complete search history.

(56) References Cited

U.S. PATENT DOCUMENTS 3,756,358 A * 9/1973 Espenschied et al. ......... 477/74
4,589,537 A * 5/1986 Nishikawa et al. ............ 477/64
5,992,255 A * 11/1999 Fujita et al. .................... 74/335
6,546,826 B2 * 4/2003 Suzuki ........................ 74/335
6,619,460 B1 * 9/2003 Carlsson et al. .......... 192/219.5
6,935,203 B2 * 8/2005 von Haeften et al. .......... 74/335
7,597,172 B1 * 10/2009 Kovach et al. .............. 180/305
2004/0106495 A1 * 6/2004 Abusamra et al. ............. 477/70
2005/0003930 A1 * 1/2005 Hopper ........................ 477/175
2005/0143220 A1 * 6/2005 Berger et al. .................. 477/96
2008/0135325 A1 * 6/2008 Stuhldreher et al. ......... 180/442

* cited by examiner

*Primary Examiner*—Roger Pang
(74) *Attorney, Agent, or Firm*—FSP LLC

(57) ABSTRACT

A hydraulically servocontrolled transmission for a road vehicle provided with an internal combustion engine; the servocontrolled transmission displays: a servocontrolled mechanical gearbox operated by at least one first hydraulic actuator; a servocontrolled clutch operated by at least one second hydraulic actuator; a hydraulic circuit comprising a hydraulic accumulator, which contains pressurised control fluid which is used by the hydraulic actuators, and a pump, which is directly operated by the internal combustion engine to supply pressurised control fluid to the hydraulic accumulator; a park-lock device operatable to block the rotation of the driving wheels; and a control unit, which, when the internal combustion engine is turned off, uses the remaining pressure of the control fluid within the hydraulic accumulator to bring the servocontrolled mechanical gearbox in a neutral position.

12 Claims, 3 Drawing Sheets

HYDRAULICALLY SERVOCONTROLLED TRANSMISSION FOR A ROAD VEHICLE PROVIDED WITH AN INTERNAL COMBUSTION ENGINE

PRIORITY

The present application claims priority to the European application entitled A HYDRAULICALLY SERVOCONTROLLED TRANSMISSION FOR A ROAD VEHICLE PROVIDED WITH AN INTERNAL COMBUSTION ENGINE, having application number 07425011.9, filed on Friday, Jan. 12, 2007, which is incorporated herein by reference.

TECHNICAL FIELD

The present invention relates to a hydraulically servocontrolled transmission for a road vehicle provided with an internal combustion engine.

BACKGROUND ART

Servocontrolled transmissions, which are structurally similar to a manual servocontrolled transmission of the traditional type except for the fact that the pedal of the clutch and the gear selection lever operated by the driver are replaced by corresponding electrical or hydraulic servo controls, are increasingly widespread. By using a servocontrolled transmission the driver must only send the control unit of the transmission the command to up-shift or down-shift and the control unit of the transmission autonomously carries out the change of gear by acting both on the engine and on the servo controls associated to the clutch and gearbox.

Generally, the servo control of the gearbox and the servo control of the clutch are of the hydraulic type and comprise corresponding hydraulic actuators connected to a common hydraulic circuit which comprises a storage tank containing the control fluid used by the hydraulic actuators (typically oil) at an ambient pressure, a hydraulic accumulator containing pressurised control fluid, an electrical pump which picks up the control fluid from the storage tank and supplies the pressurised control fluid to the hydraulic accumulator, and a number of electrovalves, which are adapted to selectively connect chambers of the hydraulic actuators to the storage tank and to the hydraulic accumulator. In other terms, in the known applications which are commercialised at present, the pump of the hydraulic circuit is actuated by an electrical motor (electrical pump assembly), which is fed by the motor vehicle battery and may therefore work independently of the state of motion of the thermal engine.

The use of an electrical pump assembly for the hydraulic circuit has several drawbacks: the electrical motor may be liable to ruptures (reduced reliability in time) especially in heavy use conditions, the electrical pump assembly is noisy, and finally the electrical pump assembly has installation criticalities as it requires an appropriate cooling of the electrical motor.

To solve the above described drawbacks, it has been suggested to eliminate the electrical motor and operate the hydraulic circuit pump by obtaining the motion directly from the thermal motor.

For instance, patent application GB2339606A describes the possibility of operating a pump of a hydraulic circuit of a transmission system obtaining the motion directly from the thermal engine; specifically GB2339606 provides the use of an auxiliary electrical motor when the motion obtained from the thermal engine is insufficient.

Also U.S. Pat. No. 5,474,428A1 describes the possibility of operating a pump of a hydraulic circuit of a transmission system obtaining the motion directly from the thermal engine or, as an alternative, by using an electrical motor; specifically, the oil supplied by the pump may be used both for lubricating the transmission and for operating the transmission during a change of gear.

However, the above described solutions which are known for eliminating the electrical motor and operating the pump of the hydraulic circuit thus obtaining the motion directly from the thermal engine are not completely satisfactory, because they provide in any case the use of a small auxiliary electrical motor which is operated when the motion obtained from the thermal engine is insufficient; accordingly, such known solutions are complicated, expensive and voluminous.

DISCLOSURE OF THE INVENTION

It is the object of the present invention to provide a hydraulically servocontrolled transmission for a road vehicle provided with an internal combustion engine, such a servocontrolled transmission being free from the above described drawbacks and, especially, being easy and cost-effective to implement.

According to the present invention there is provided a hydraulically servocontrolled transmission for a road vehicle provided with an internal combustion engine as claimed in the attached claims.

BRIEF DESCRIPTION OF THE DRAWINGS

The present invention will now be described with reference to the accompanying drawings, which show a non-limitative example of embodiment thereof, in which.

PREFERRED EMBODIMENTS OF THE INVENTION

Figure 1:
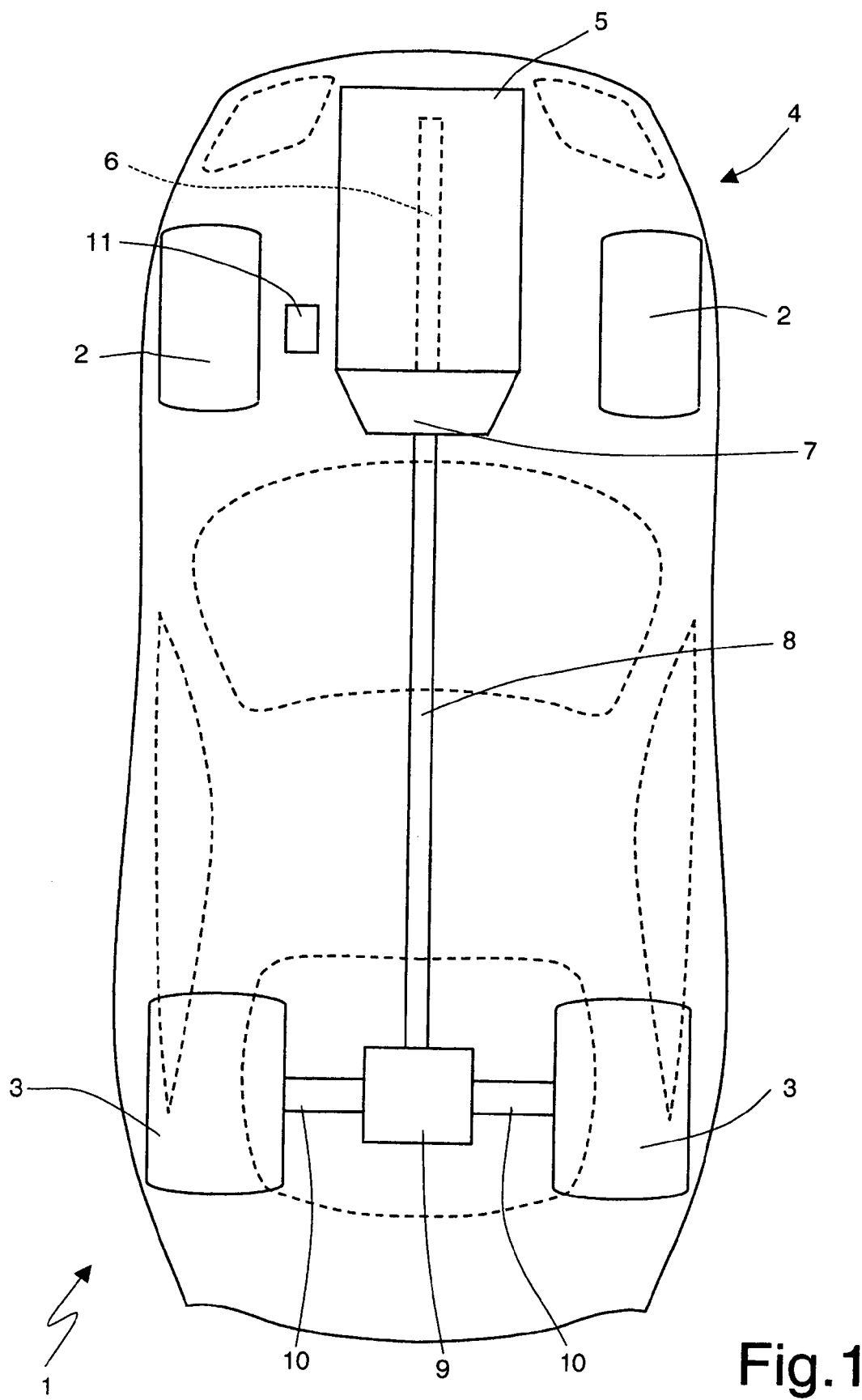
FIG. 1 is a diagrammatic plan view of a rear wheel drive motor vehicle provided with a servocontrolled transmission made according to the present invention.

In FIG. 1, numeral 1 indicates, as a whole, a motor vehicle provided with two front wheels 2 and two rear driving wheels 3 which receive the driving torque from a power system 4.

The power system 4 comprises an internal combustion engine 5, which is arranged in a front position and is provided with a drive shaft 6 which rotates at an angular speed $\omega_m$, and a servocontrolled transmission 7, which is arranged in a front position, is housed in a bell integral with the internal combustion engine 5 and transmits the driving torque generated by the internal combustion engine 5 to the rear driving wheels 3. From the servocontrolled transmission 7, a transmission shaft 8 extends, which ends in a differential 9, from which a pair of axle shafts 10 extends, with each of the axle shafts being integral with a rear driving wheel 3. The motor vehicle 1 comprises an electrical control unit 11 (diagrammatically shown), which controls the power system 4 and therefore drives both the internal combustion engine 5 and the servocontrolled transmission 7.

Figure 2:
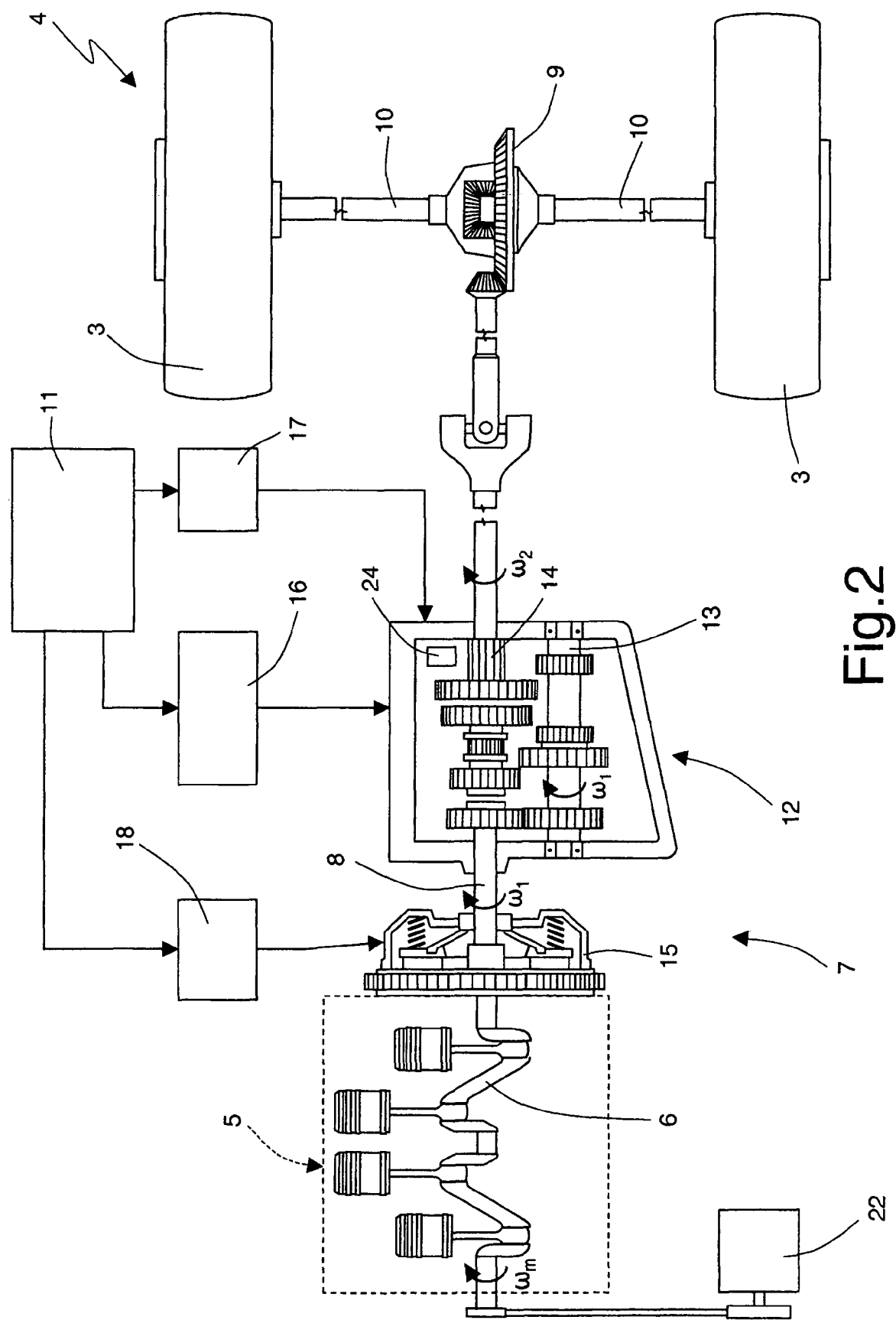
FIG. 2 is a diagrammatic view of a thermal engine and of the servocontrolled transmission of the motor vehicle in FIG. 1.

According to what is shown in FIG. 2, the servocontrolled transmission 7 comprises a servocontrolled mechanical gearbox 12 provided with a primary shaft 13 which rotates at an angular speed $\omega_1$ and is connectable to the drive shaft 6 and with a secondary shaft 14 which rotates at an angular speed $\omega_2$ and is connected to the transmission shaft 8 that transmits the motion to the driving wheels 3. A servocontrolled disc clutch 15 is interposed between the drive shaft 6 and the primary shaft 13 of the gearbox 12 to connect and disconnect the drive shaft 6 to/from the primary shaft 13 of the gearbox 12.

The servocontrolled mechanical gearbox 12 is operated by a hydraulic actuator 16 to engage/disengage a gear and by a hydraulic actuator 17 to select a gear; the servocontrolled clutch 15 is operated by a single hydraulic actuator 18 to shift the clutch 15 itself between an open position and a closed position. The hydraulic actuators 16, 17 and 18 are driven by the electric control unit 11 and are connected to a hydraulic circuit 19 (shown in FIG. 3).

Figure 3:
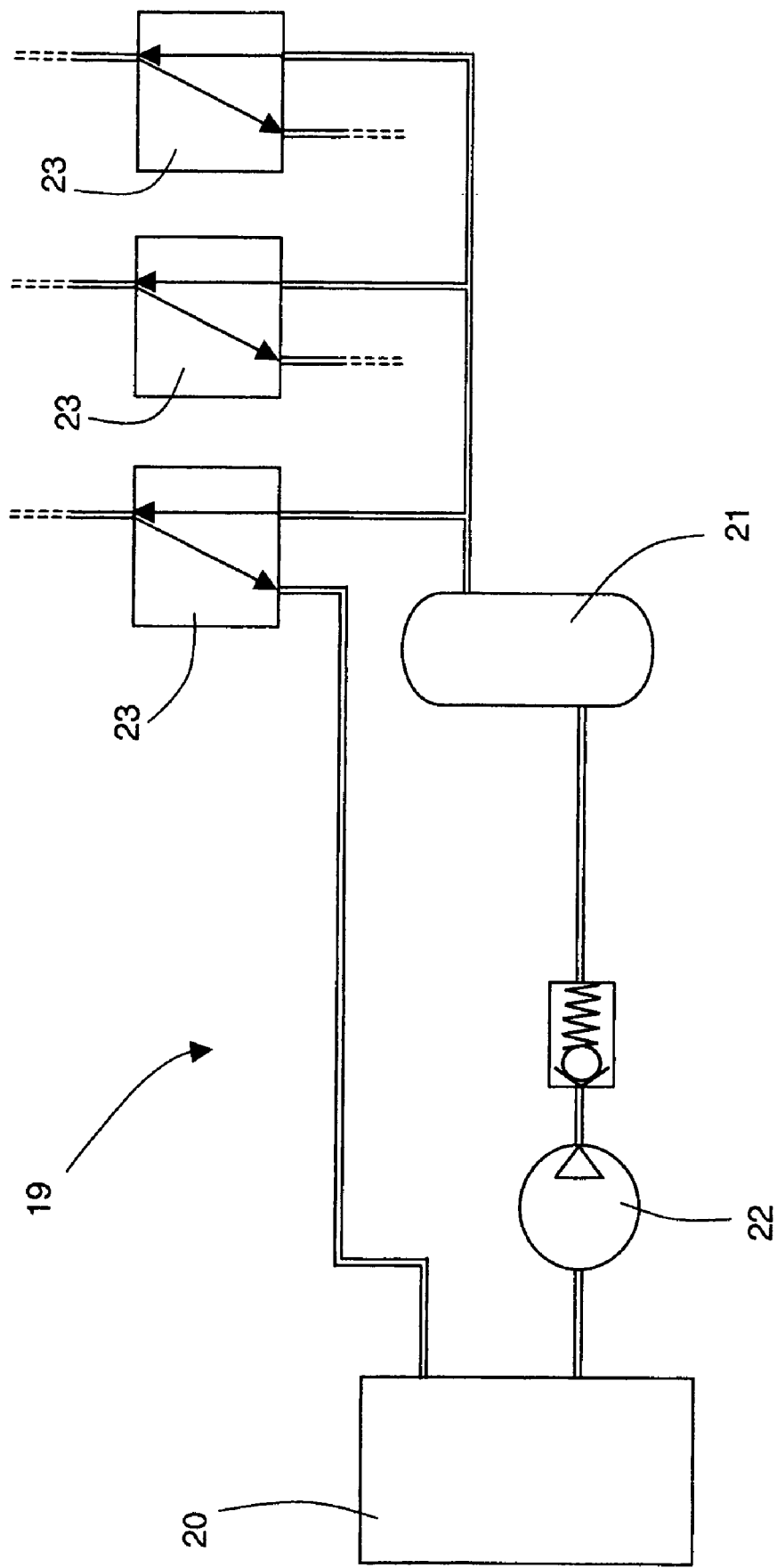
FIG. 3 is a diagram of a part of a hydraulic circuit of the servocontrolled transmission in FIG. 2.

According to what is shown in FIG. 3, the hydraulic circuit 19 comprises a storage tank 20 containing the control fluid used by the hydraulic actuators 15, 16 and 17 (typically oil) at an ambient pressure, a hydraulic accumulator 21 containing pressurised control fluid, a pump 22 which picks up the control fluid from the storage tank 20 and supplies the pressurised control fluid to the hydraulic accumulator 21, and three electrovalves 23, which are adapted to selectively connect chambers of the corresponding hydraulic actuators 15, 16 and 17 with the storage tank 20 and with the hydraulic accumulator 21. Specifically, a corresponding three-way electrovalve 23 is associated to each chamber of the hydraulic actuators 15, 16 and 17, with the three-way electrovalve 23 being adapted to maintain the chamber isolated to maintain the control fluid within the chamber constant, to connect the chamber to the storage tank 20 to discharge the control fluid present within the chamber or to connect the chamber to the hydraulic accumulator to supply the control fluid within the chamber.

According to what is shown in FIG. 2, the servocontrolled transmission 7 comprises a park-lock device 24 operatable by the driver by means of a control operated manually to block the rotation of the driving wheels 3. According to a preferred embodiment, the park-lock device 24 is electrically interfaced with the safety device in a start-up block of the motor vehicle 1 so that the extraction of the start-up key for the internal combustion engine 5 is possible only when the park-lock device 24 is active to block the rotation of the driving wheels 3. The park-lock device 24 may be arranged within the servocontrolled mechanical gearbox 12 to act on the secondary shaft 14 (as shown in FIG. 2), or the park-lock device 24 may be arranged within the differential 9 to act on the transmission shaft 8 or on the axle shafts 10.

Furthermore, the pump 22 is directly actuated by the internal combustion engine 5 to supply pressurised control fluid to the hydraulic accumulator 21. When the internal combustion engine 5 is turned off, the control unit 11 uses the remaining pressure of the control fluid within the hydraulic accumulator 21 to bring the servocontrolled mechanical gearbox 12 in a neutral position. In this manner, it is always possible to start up the internal combustion engine 5 again without needing to act on the servocontrolled clutch 15; furthermore, in virtue of the action of the park-lock device 24 (which needs to be operated in order to extract the start-up key) the motor vehicle 1 remains in any case braked in the parked position even if the servocontrolled mechanical gearbox 12 is in neutral position.

According to an embodiment shown in FIG. 2, the pump 22 is operated obtaining the motion from the driving shaft 6 of the internal combustion engine 5 by means of a belt transmission; in this case, the pump 22 receives the motion when the internal combustion engine 5 is running independently of the state of the servocontrolled clutch 15.

According to an alternative embodiment (not shown), the pump 22 is operated obtaining the motion from the driving shaft 6 of the internal combustion engine 5 by means of an auxiliary shaft, which is coaxial to the primary shaft 13 of the servocontrolled gearbox 12 and is moved by the flywheel; in this case as well, the pump 22 receives the motion when the internal combustion engine 5 is running independently of the state of the servocontrolled clutch 15.

According to a further embodiment (not shown), the pump 22 is operated by obtaining the motion of the primary shaft 13 of the servocontrolled mechanical gearbox 12; in this case, the pump 22 receives the motion when the internal combustion engine 5 is running and the servocontrolled clutch 15 is in a closed position. According to such an embodiment, the control unit 11 automatically brings the servocontrolled mechanical gearbox 12 in a neutral position if the servocontrolled clutch 15 remains in the open position for a time longer than the determined time interval of 10 seconds, by way of example. By operating in this manner, the control unit 11 may decide to close the servocontrolled clutch 15 to operate the pump 22 again if the pressure within the hydraulic accumulator 21 falls to values which are too low.

According to a further embodiment (not shown), it is possible to use a single operating hydraulic system for the oil used by the hydraulic actuators 16, 17 and 18 and for the oil used for the lubrication of the servocontrolled mechanical gearbox 12.

The above described servocontrolled transmission 7 is especially reliable and simple and cost-effective to implement in virtue of the absence of any type of electrical motor connected to the pump 22 of the hydraulic circuit 19.

A traditional servocontrolled transmission 7 leaves the motor vehicle 1 turned off and parked with a gear engaged; instead, after the internal combustion engine has been turned off, the above described new servocontrolled transmission always and automatically brings the servocontrolled mechanical gearbox 12 in neutral and the function of maintaining the motor vehicle 1 still is carried out by the park-lock device 24.

A traditional servocontrolled transmission 7 allows the start up of the internal combustion engine only after having opened the clutch and brought the gear in neutral; accordingly, in a traditional servocontrolled transmission 7 the actual start up of the internal combustion engine is always delayed with respect to the control of the driver. Instead, the above described new servocontrolled transmission 7 allows the start up of the internal combustion engine 5 immediately and without any delay as the servocontrolled mechanical gearbox 12 is already in a neutral position.

The invention claimed is:

1. A servocontrolled hydraulically transmission (7) for a road vehicle (1) provided with an internal combustion engine (5); the servocontrolled transmission (7) comprises:

a servocontrolled mechanical gearbox (12) operated by at least one first hydraulic actuator (16, 17) and provided with a primary shaft (13) connectable to a drive shaft (6) and with a secondary shaft (14) connected to a transmission shaft (8) which transmits a motion to driving wheels (3);

a servocontrolled clutch (15) operated by at least one second hydraulic actuator (18) and interposed between the drive shaft (6) and the primary shaft (13) of the gearbox (12) to connect and disconnect the drive shaft (6) to the primary shaft (13) of the gearbox (12);

a hydraulic circuit (19) comprising a hydraulic accumulator (21), which contains pressurised control fluid which is used by the hydraulic actuators (16, 17, 18), and a pump (22), which is directly operated by the internal combustion engine (5) to supply the pressurised control fluid to the hydraulic accumulator (21);

a park-lock device (24) operatable to block the rotation of the driving wheels (3); and a control unit (11), which, when the internal combustion engine (5) is turned off, uses a remaining pressure of the control fluid within the hydraulic accumulator (21) to automatically bring the servocontrolled mechanical gearbox (12) in a neutral position.

2. A servocontrolled transmission (7) according to claim 1, wherein the pump (22) is operated by obtaining the motion from the drive shaft (6) of the internal combustion engine (5).

3. A servocontrolled transmission (7) according to claim 2, wherein the pump (22) is operated by obtaining the motion directly from the drive shaft (6) of the internal combustion engine (5).

4. A servocontrolled transmission (7) according to claim 2, wherein the pump (22) is operated by obtaining the motion from a flywheel set in rotation by the drive shaft (6) of the internal combustion engine (5).

5. A servocontrolled transmission (7) according to claim 4, wherein the pump (22) is operated by an auxiliary spindle which is coaxial to the primary shaft (13) of the servocontrolled gearbox (12) and moved by the flywheel.

6. A servocontrolled transmission (7) according to claim 2, wherein the pump (22) is operated by obtaining the motion from the primary shaft (13) of the servocontrolled mechanical gearbox (12).

7. A servocontrolled transmission (7) according to claim 6, wherein the control unit (11) automatically brings the servocontrolled mechanical gearbox (12) in the neutral position if the clutch (15) remains in the open position for a time longer than a determined time interval.

8. A servocontrolled transmission (7) according to claim 7, wherein the control unit (11) closes the servocontrolled clutch (15) to operate the pump (22) again if the pressure within the hydraulic accumulator (21) falls under a given threshold.

9. A servocontrolled transmission (7) according to claim 1, wherein the park-lock device (24) is operatable by the driver by means of a manually operatable control.

10. A servocontrolled transmission (7) according to claim 9, wherein the park-lock device (24) is electrically interfaced with a safety device in a start-up block so that the extraction of a start-up key is possible only when the park-lock device (24) is active to block the rotation of the driving wheels (3).

11. A method for the control of a hydraulically servocontrolled transmission (7) for a road vehicle (1) provided with an internal combustion engine (5); the servocontrolled transmission (7) comprises:

a servocontrolled mechanical gearbox (12) operated by at least one first hydraulic actuator (16, 17) and provided with a primary shaft (13) connectable to a drive shaft (6) and with a secondary shaft (14) connected to a transmission shaft (8) which transmits a motion to driving wheels (3);

a servocontrolled clutch (15) operated by at least one second hydraulic actuator (18) and interposed between the drive shaft (6) and the primary shaft (13) of the gearbox (12) to connect and disconnect the drive shaft (6) to/from the primary shaft (13) of the gearbox (12);

a hydraulical circuit (19) comprising a hydraulic accumulator (21), which contains pressurised control fluid which is used by the hydraulic actuators (16, 17, 18), and a pump (22), which is directly operated by the internal combustion engine (5) to supply pressurised control fluid to the hydraulic accumulator (21); and a park-lock device (24) to block the rotation of the driving wheels (3);

the method for the control of the servocontrolled transmission (1) comprises the step of automatically bringing the servocontrolled mechanical gearbox (12) in a neutral position when the internal combustion engine (5) is turned off by using a remaining pressure of the control fluid within the hydraulic accumulator (21).

12. A method according to claim 11, comprising the further step of allowing the extraction of a start-up key from a start-up block only when the park-lock device (24) is active to block the rotation of the driving wheels (3).

\* \* \* \* \*